3,741,775
MEAT-TYPE AROMAS AND THEIR PREPARATION
Chi-Hang Lee, Spring Valley, N.Y., assignor to General Foods Corporation, White Plains, N.Y.
No Drawing. Filed Dec. 7, 1970, Ser. No. 95,903
Int. Cl. A23l *1/26*
U.S. Cl. 99—140 R  10 Claims

ABSTRACT OF THE DISCLOSURE

An aqueous solution of cysteine, thiamine and a 6-deoxy hexose is reacted at boiling temperature for a sufficient period of time to produce a meatlike aroma and flavor which is characteristic of roast and/or cooked beef. The composition evolving this aroma may be concentrated, stored and combined with solvents, carriers, extenders, thickeners, flavors and other aroma imparting materials.

BACKGROUND OF THE INVENTION

Field of the invention

This invention relates to the production of novel flavoring compositions which are characterized by their meatlike flavor. The meat flavors derived from the processes of this invention are those of "cooked" meats such as roast beef, roast pork, boiled beef and the like. These compositions may be utilized in the preparation of foodstuffs for purposes of enhancing or introducing meatlike aromas and flavors—i.e. as in the preparation of soups, gravies and the like.

Description of the prior art

In the area of developing meat-type flavors and aromas for ultimate use in enhancing or imparting meatlike flavors to various foodstuffs, it has been traditionally expedient to produce these flavors by employing some form of proteinaceous material, for example, beef or pork stock alone. Recently the art has progressed to the point of developing meatlike flavors and aromas by heating a compound from the group consisting of pentose and hexose monosaccharides with vegetable protein hydrolysate and 5′-ribonucleotides such as inosinic and guanylic acids and their physiologically acceptable salt. The pentose monosaccharides employed were ribose, arabinose and xylose. Exemplary of the hexose monosaccharides used were glucose, dextrose and fructose.

Still further, the development of meatlike flavors have been attained by wholly omitting the utilization of a proteinaceous material as an essential ingredient in the process. Accordingly, U.S. Pat. No. 2,934,437 produces meat flavors by reacting pentose and hexose monosaccharides with either cystine or cysteine in the presence of water at elevated temperatures.

SUMMARY OF THE INVENTION

It has now been discovered that a novel means for producing meat-type flavors is available. Thus by reacting an aqueous solution of cysteine, thiamine and a 6-deoxy hexose at boiling temperatures a meatlike aroma which is characteristic of cooked meats such as roast beef, roast pork and boiled beef is produced. The nature, intensity and quality of the flavor produced will depend upon such factors as the relative amounts and types of 6-dexoy hexoses, thiamine, and cysteine; as well as the amount of water present and the time temperature of heating. Consequently, specific variations in the conditions of reaction and in the relative amounts and proportions of ingredients will result in more specific flavors of varying intensities. Moreover, it is to be emphasized that the invention may employ cysteine and glutathione as well as cysteine, or combinations of the three, either as is, or in the form of its physiologically acceptable salts, such as the hydrochloric acid salts. Similarly, the physiologically acceptable salts of thiamine as well as thiamine per se is operable—i.e. thiamine hydrochloride.

The invention is especially useful when the meat flavored composition produced is concentrated and combined with materials such as thickeners, solvents, carriers, extenders and other flavor and aroma imparting materials. Moreover, the meat-flavored composition may be incorporated either as solutions or powders, as is convenient in protein gels, luncheon meats, dry soup mixes, meat spreads, and the like.

The principal obect of the invention is to prepare meat-type aromas and flavors without the necessity of employing a proteinaceous ingredient as an essential element in the process by reacting an aqueous solution of cysteine, thiamine, and a 6-deoxy hexose at elevated temperatures.

Another object of the invention is to develop a cooked meat aroma and flavor which is characteristic of the aroma of roast beef, roast pork, or boiled pork by reacting an aqueous solution of cysteine, thiamine and rhamnose at elevated temperature.

Other objects and advantages of the invention will become apparent in the description and examples hereinafter appearing.

DETAILED DESCRIPTION OF THE INVENTION

The process of producing the novel flavoring compositions of this invention essentially entail heating an aqueous solution containing cysteine, thiamine and a 6-deoxy sugar at elevated temperatures until flavors characteristic of "cooked" meats such as roast beef, roast pork, boiled beef and the like are developed. The heating step is conducted on a solution or suspension having equal quantities by weight of cysteine, thiamine and a 6-deoxy hexose; however, neither the amount of each compound nor the cumulative amount of these compounds are critical to the development of the heat-type flavor and aroma. The effect of varying the individual as well as the cumulative quantities of the compounds with respect to each other, and as relates to the quantities per weight of solution merely functions to alter or modify the nature, intensity, and quality of the meat-type flavors produced. Moreover, unless all three of the compounds are employed, no meat type aroma will ensue upon heating.

The preferred quantities of cysteine, thiamine, and 6-deoxy hexose will constitute about 2½ percent by weight of water for each, and about 7½ percent by weight of water for the cumulative quantities. Preferential temperature and time conditions developing the meat-type flavor will constitute heating at about 100° C. to 110° C. for about 1 to 1½ hours. However, these conditions are not critical and any heating of the above compounds in aqueous solution at a pH between 3.5–7.5 for a period of time sufficient to develop the meat-type flavor and aroma will suffice.

Upon concentrating the developed meat-flavored compositions by employing conventional concentration techniques such as evaporation, spray drying or freeze drying, the composition may be utilized in powder form in dry soup mixes. Alternatively, it may be employed with any edible carrier. For example, the composition may be utilized in solution and combined with materials such as thickeners, solvents, carriers, extenders and other flavor imparting materials.

The invention will now be described by reference to specific examples.

EXAMPLE I

About 0.5 part by weight of each of cysteine, thiamine and rhamnose are combined and added to about 20 parts by weight of water at ambient temperature. The solution is placed on a steam bath at 100° C. to 110° C. for 1 to 1½ hours, whereupon a "cooked" meat-type aroma characteristic of roast beef is developed.

EXAMPLE II

Same as Example I, except that the 6-deoxy hexose is 6-deoxy glucose instead of rhamnose.

EXAMPLE III

Same as Example I, except that the 6-deoxy hexose is 6-deoxy galactose instead of rhamnose.

While the invention has been described by reference to the above examples, it is to be understood that the inventive concept is not limited thereto. Accordingly other 6-deoxy hexoses may be employed with equally beneficial results. Included among these hexoses are: 6-deoxy altrose, 6-deoxy allose, 6-deoxy idose, 6-deoxy talose, and 6-deoxy gulose. Similarly, degradation products of thiamine, such as 5-hydroxyethyl-4-methyl thiazole may be utilized in lieu of thiamine with comparable results. Thus, the scope of the appended claims will define the bounds of the inventive concept.

I claim:

1. A process for preparing a cooked meat flavor and aroma which consists essentially of reacting at an elevated temperature an aqueous solution or suspension of a sugar consisting of 6-deoxy hexose with a compound selected from the group consisting of thiamine, 5-hydroxyethyl-4-methyl thiazole, their physiologically acceptable salts and mixtures thereof and a compound selected from the group consisting of cysteine, cystine, glutathione, their physiologically acceptable salts and mixtures thereof.

2. The process according to claim 1 wherein the 6-deoxy hexose is selected from the group consisting of rhamnose, 6-deoxy glucose, and 6-deoxy galactose.

3. The process according to claim 1 wherein the 6-deoxy hexose is rhamnose.

4. A method of enhancing the meat flavor of foodstuffs comprising adding an effective amount of the aqueous reaction product consisting essentially of a sugar consisting of 6-deoxy hexose, a compound selected from the group consisting of thiamine, 5-hydroxyethyl-4-methyl thiazole, their physiologically acceptable salts and mixtures thereof, and a compound selected from the group consisting of cysteine, cystine, glutathione, their physiologically acceptable salts and mixtures thereof to said foodstuffs.

5. A novel flavoring composition adapted to impart a cooked meat aroma and flavor to foodstuffs comprising the aqueous reaction product of a sugar consisting of 6-deoxy hexose, a compound selected from the group consisting of thiamine, 5-hydroxyethyl-4-methyl thiazole, their physiologically acceptable salts and mixtures thereof, and a compound selected from the group consisting of cysteine, cystine, glutathione, physiologically acceptable salts and mixtures thereof.

6. The composition of claim 5 wherein the 6-deoxy hexose component is rhamnose.

7. The composition of claim 5 wherein the 6-deoxy hexose component is selected from the group consisting of 6-deoxy glucose and 6-deoxy galactose.

8. A novel flavoring composition adapted to impart a cooked meat aroma and flavor to foodstuffs comprising the reaction product of a 6-deoxy hexose, thiamine, and cystine.

9. A novel flavoring composition adapted to impart a cooked meat aroma and flavor to foodstuffs comprising the reaction product of a 6-deoxy hexose, thiamine, and glutathione.

10. A meat flavored edible carrier in which the reaction product of a 6-deoxy sugar, thiamine, and cysteine, is incorporated.

References Cited

UNITED STATES PATENTS

| | | | |
|---|---|---|---|
| 3,394,016 | 7/1968 | Bidmead et al. | 99—140 |
| 3,519,437 | 7/1970 | Giacino | 99—140 |
| 2,446,478 | 8/1948 | Kremers | 99—140 |
| 3,681,088 | 8/1972 | Katz | 99—140 R |

JOSEPH SCOVRONEK, Primary Examiner

S. MARANTZ, Assistant Examiner

U.S. Cl. X.R.

99—107

UNITED STATES PATENT OFFICE
CERTIFICATE OF CORRECTION

Patent No. 3,741,775            Dated June 26, 1973

Inventor(s) Chi-Hang Lee

It is certified that error appears in the above-identified patent and that said Letters Patent are hereby corrected as shown below:

In Column 1, line 43, before "and", first occurrence, change "ysate" to -- ysates -- .  In Column 2, line 13, after "principal" and before "of", change "obect" to -- object -- ; line 39, after "the" and before "-type", change "heat" to -- meat -- .

Signed and sealed this 8th day of January 1974.

(SEAL)
Attest:

EDWARD M. FLETCHER, JR.　　　　　RENE D. TEGTMEYER
Attesting Officer　　　　　　　　　Acting Commissioner of Patents